(No Model.) 5 Sheets—Sheet 1.

L. W. OSBORN.
CORN HARVESTER AND HUSKER.

No. 397,998. Patented Feb. 19, 1889.

Witnesses.

Inventor
Luke W. Osborn
By Chas. G. Page
Atty.

(No Model.) 5 Sheets—Sheet 2.

L. W. OSBORN.
CORN HARVESTER AND HUSKER.

No. 397,998. Patented Feb. 19, 1889.

Witnesses
W. Rossiter
L. S. Logan

Inventor
Luke W. Osborn
By Chas. G. Page
Atty.

(No Model.) 5 Sheets—Sheet 4.

L. W. OSBORN.
CORN HARVESTER AND HUSKER.

No. 397,998. Patented Feb. 19, 1889.

Witnesses
W. Rossiter
L. L. Page

Inventor
Luke W. Osborn.
By Chas. G. Page
atty.

(No Model.)  5 Sheets—Sheet 5.

L. W. OSBORN.
CORN HARVESTER AND HUSKER.

No. 397,998. Patented Feb. 19, 1889.

Witnesses
W. Rossiter
L. L. Page

Inventor
Luke W. Osborn
By Chas. G. Page
Atty.

UNITED STATES PATENT OFFICE.

LUKE W. OSBORN, OF JOLIET, ILLINOIS, ASSIGNOR TO DANIEL ROBERTSON, IRVING D. STEVENS, AND LLOYD EBERHART, ALL OF SAME PLACE.

CORN HARVESTER AND HUSKER.

SPECIFICATION forming part of Letters Patent No. 397,998, dated February 19, 1889.

Application filed August 17, 1887. Serial No. 247,167. (No model.)

*To all whom it may concern:*

Be it known that I, LUKE W. OSBORN, a citizen of the United States, residing at Joliet, in the county of Will and State of Illinois, have invented a certain new and useful Improvement in Corn Harvesters and Huskers, of which the following is a specification.

This invention relates particularly to improvements in corn harvesting and husking machines wherein, during the progress of the machine through the field, the ears are first snapped from the standing stalks and then husked, in contradistinction to corn-harvesters wherein the ears are simply snapped or pulled from the stalks and collected in an unhusked condition, and in further contradistinction to corn harvesters and huskers wherein it has been attempted to husk and collect the ears without detaching the husks from the stalks.

Among the more prominent ends which are necessary to be attained in order to provide a practically successful corn harvesting and husking machine the following may be noted, to wit: certainty in gathering the entire crop of corn irrespective of the condition of the stalks or of the position of the ears thereon; rapidity and certainty of action, and the provision of means for performing the work at a rate of speed sufficiently rapid to avoid entanglement of the stalks in the machine and hinderance to the free and effective operation of any of its working parts; absolute certainty in snapping off the ears without pulling up the stalks, and the avoidance of transferring an ear while on the stalk from the snapping to the husking portion of the machine; certainty of and rapidity in husking; the avoidance of shelling the corn in either snapping or husking; the accommodation of the machine to stalks of all heights and sizes; quick entry of the stalks into the machine and a rapid departure of the stalks from the same; the avoidance of breaking down the stalks; simplified means for operating the snapping and husking devices; the avoidance of a wide cumbersome machine, and the absence of devices for shifting the ears about to localities remote from each other; the provision of a strong and durable machine having a comparatively light draft, and the attainment of a construction and organization generally efficient in all of the chief ends heretofore sought for in corn harvesters and huskers, as well as practical and efficient in its several details.

To the attainment of all of the foregoing and other useful ends my invention consists in matters hereinafter described, and particularly pointed out in the claims.

In a corn harvesting and husking machine embodying the several features of my improvement the stalks irrespective of their condition are brought to a uniform standing condition and directed to and between a pair of snapping-rolls, which serve to draw the stalks down between them, and while so doing to effect the snapping off of the ears in an unhusked condition. The ears as soon as snapped off are carried directly back to and along a pair of husking-rolls, which are arranged as rear extensions of the snapping-rolls, but which subserve the separate and distinct purpose of husking the ears which have been previously snapped off along the forwardly-arranged snapping-rolls. The stalks after being raised to a uniform standing condition, so as to permit them to properly enter between the snapping-rolls, are bent or inclined in a direction contrary to the advancement of the machine, so as to facilitate their passage downwardly between the snapping-rolls, which latter are desirably inclined and extended to such a height that the stalks can usually be drawn freely between them and finally released without need of arresting the passage of the stalks in such rearwardly-inclined condition. The stalks while being drawn down between the snapping-rolls are pinched close up to the butt-ends of the ears, which latter are, however, prevented from getting caught between the rolls, thereby insuring the rapid and effective snapping off of the ears at their weakest point of connection with the stalks and avoiding shelling of the corn. The snapped-off ears are not permitted to accumulate over the snapping-rolls and are carried back along the same without any grinding or cutting action. Upon reaching the husking-rolls the ears are subjected to an exposure of husking-roll surface suitable for scratching or loosening up the husks, which are gripped between the husking-rolls, leaving the ears to be carried on to the point of discharge. The ears from the farthest forward point of snapping to the point of discharge in rear of the husking-rolls traverse a substantially-direct path, and as soon as the ears are snapped off they are immediately carried back along such path, thereby avoiding any clogging up of the machine.

It is herein understood that the terms "snapping-rolls" and "husking-rolls" comprehend either the respective forward and rearward portions of two long rolls suitably adapted for snapping off the ears along their forward portions and having their rear portions suitably adapted for husking such snapped-off ears, or two separate pairs of rolls, with the rear husking-rolls arranged to constitute, in effect, rear extensions of the forwardly-arranged snapping-rolls, and that with regard to the feature of such snapping-rolls and husking-rolls, combined with an elevating-conveyer consisting of an endless chain or belt provided with fingers which take the ears at the points where they are snapped off along the snapping-rolls and carry said ears directly back to and along the husking-rolls, no particular limitation is herein placed upon the construction of husking and snapping rolls, save that the forwardly-arranged snapping-rolls are to involve the distinctive characteristic of an adaptation to snap the ears from the stalks in an unhusked condition, and the rearwardly-arranged husking-rolls to involve the distinctive characteristic of an adaptation to strip the husks from the loose ears that have been snapped off by said snapping-rolls; and in this connection it will be apparent to those skilled in the art that in various other combinations, hereinafter set forth and claimed, various forms or constructions of rolls and guards may be employed without departing from the spirit of my invention. In the following description, however, certain details of construction in both the guards and rolls, serving to attain special features of improvement, are set forth, and in the drawings I have represented devices which I regard as highly effective and as involving such various features of special improvement, which in certain claims hereinafter made are specifically stated.

In said drawings.

The main frame or body A and the main driving and supporting wheels B of the corn harvesting and husking machine represented in said drawings are arranged for straddling a row of corn as it stands in the field, the two main driving and supporting wheels being disposed for travel, respectively, along opposite sides of the row. The upper side of the main or body frame inclines downwardly from rear to front, and, desirably, the frame is as a whole tilted to some extent, so as to depress its forward end and bring the same within a comparatively short distance from the ground, the caster-wheels C serving as means for properly upholding such forward end of the machine.

D indicates one and E denotes the other of a pair of inclined parallel rolls, which are mounted in appropriate bearings and driven in opposite directions from one or both of the main driving and supporting wheels B. These rolls are arranged along the inclined upper side of the main or body frame and extend nearly the length of the machine. Said rolls partake of the inclination given to such upper inclined side of the main or body frame, whereby their lower ends shall be comparatively low down at the front end of the machine, from which point the rolls incline upwardly to the rear, as herein clearly illustrated. These rolls act conjointly to attain two distinct results at separate portions of their length, the first being the snapping of the ears from the stalks and the second the husking of the ears after they have been thus severed. A certain length of the roller-surface afforded by said rolls and commencing at or near their lower forward ends is devoted exclusively to snapping off the ears, while the remaining upper length of roller-surface, commencing at or adjacent to the upper terminal of the snapping-off surface and extending substantially to the rear elevated ends of the rolls, is devoted to husking the severed ears. By such arrangement the machine is in effect provided with a pair of parallel rotary snapping-rolls or snapping-roll lengths, as they may indifferently be termed, and with a pair of parallel rotary husking-rolls or husking-roll lengths, which are extended back from the rear terminals of the forwardly-arranged snapping-rolls, it being obvious that while it is mechanically better to form each snapping-roll portion integral with the husking-roll portion immediately back of the same the same general result would be attained by a pair of axles provided with forward snapping-rolls and rear husking-rolls or by severing all connection between the forward and rear portions of rolls. In the latter case, however, more complicated roll-driving mechanism is required, whereas by employing two long rolls having one portion of their length adapted for snapping and another portion of their length adapted for husking, the rolls can be economically driven from one end. In either instance provision is made for an open guideway for the ears extending back from the forward terminal portions of the snapping-rolls to the rear terminal portions of the husking-rolls, so that the ears when snapped off at points along the snapping-rolls can by a conveyer, such as hereinafter set forth, be carried back freely and without delay.

The rolls are preferably inclined, since if arranged horizontally the stalks must be drawn down between the rolls to such an extent as to break the stalks and prevent rapid and efficient action. The snapping-rolls are therefore herein shown inclined, and in practice the forwardly-arranged snapping-rolls will usually be extended up to such height as will permit the stalks irrespective of their height to be drawn freely between the rolls and without necessitating the presence of a stalk-bender arranged for bending the stalks forward, as in many heretofore-proposed machines.

Preparatory to receiving the stalks between the snapping-rolls it is desirable to bring the stalks to a uniform standing condition and to gather them up no matter how closely they may be found laid to the ground.

To the attainment of such end the machine is provided at its forward end with a pair of stalk-lifters, F, respectively located at opposite sides of the gap, which at the forward end of the machine constitutes the entrance to a space or passage provided through the machine for the standing stalks. Each of the two stalk-lifters herein shown consists simply of an arm or bar, 1, provided with an upturned portion, 2, and at its rear end hinged or pivotally attached to an adjustable frame or support that is provided as a support for the harvesting devices and arranged upon the main frame of the machine. These stalk-lifters are maintained at a proper height above the ground by small wheels 3, preferably one for each stalk-lifter. The two stalk-lifters are set apart at a distance suitable for permitting them to respectively pass along opposite sides of the row of ear-bearing stalks and to engage under and raise fallen stalks or stalks that may have dropped toward either on both sides of the row, the upturned portions 2 of said devices serving to further raise the stalks and bring the same within reach of the gathering-chains.

Figures 1, 2, 3, 4:
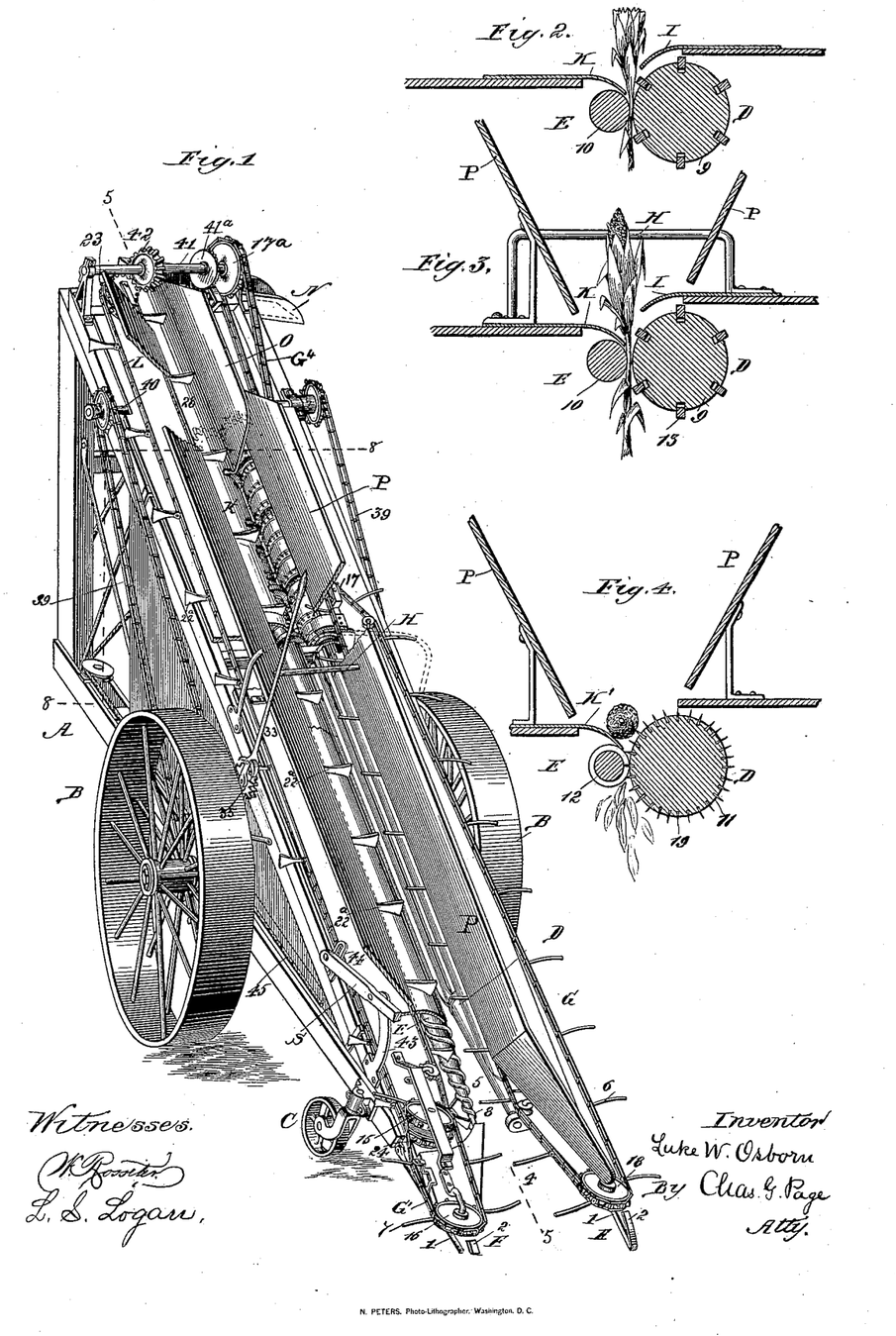
Figure 1 represents in perspective a corn harvesting and husking machine embodying my invention, portions of certain longitudinally-arranged guards and also a portion of one of the stalk-lifters being broken away for convenience of illustration.
Fig. 2 is a sectional detail taken transversely through the snapping portions of the rolls and the guards over the same, and represents the position of a stalk preparatory to snapping the ear therefrom, the point at which said section is taken being indicated by dotted line 2 2, Fig. 6.
Fig. 3 is a view similar to Fig. 2, but taken at a point adjacent to the upper terminals of the snapping-off portions of the rolls, so as to show the check or arm H employed for breaking off the ear in case the same should not have snapped off lower down the rolls, the point at which said section is taken being indicated by dotted line 3 3, Fig. 6, wherein, however, the raised check H and the side-boards P (shown in Fig. 3) are for convenience of illustration omitted.
Fig. 4 is a view similar to the last preceding views, but taken through the husking portions of the rolls, the point at which the section is taken being indicated by dotted lines 4 4, Fig. 6, wherein, as hereinbefore observed, the side-boards P are not shown.

The gap or forward end of the stalk-receiving space or passage tapers or converges rearwardly from the stalk-lifters to the lower forward ends of the rolls, as at 4, Fig. 1, whereby the stalks raised by the stalk-lifters as well as such stalks as are standing can be properly guided to a receiving-space, 5, that is provided between said ends of the rolls by tapering one or both of the forward terminal portions of the rolls, said tapered ends of the rolls, or, preferably, the lower end of roll E, being provided with a spiral thread, 8, which assists as a feed device for feeding the stalks to the space between the snapping-rolls.

G indicates one and G' the other of a pair of endless gathering or feed chains or link belts that are respectively provided with fingers 6 and 7 for gathering in the stalks at the forward end of the machine and feeding the same into the stalk-receiving space between the lower forward ends of the rolls. These endless chains travel in an inclined plane parallel or substantially parallel with the axes of the rolls, and are arranged so that during their travel their fingers shall be brought in front of and gather in any and all stalks that may have been raised by the stalk-lifters. The distance at which the inner oppositely-disposed leaves or lengths of these chains are set apart and the length of their fingers are such that when any two oppositely-arranged fingers, respectively, of the two chains are brought in position to cross a stalk in advance of the same said fingers shall overlap one another—that is to say, be brought together for a portion of their length—thereby serving to effectively gather in the stalks and to feed the same with certainty to the rolls. These chains may be driven in any convenient way from the driving-wheels, but are desirably driven at a higher rate of speed than the speed at which the machine is advanced through the field, for a purpose hereinafter set forth.

The rolls revolve in contrary directions and in a way to draw the stalks down between their snapping portions, and since the rolls are arranged to incline upwardly from front to rear of the machine the advancement of the machine through the field necessarily permits the rolls while receiving the stalks between them at a point comparatively low down to present to such stalks a pair of snapping-roll portions which rise relatively to the stalk in proportion to the advancement of the machine. It is desirable, however, to further facilitate the speed with which the stalks pass down between the rolls in order to avoid clogging or entanglement and to provide for a free efficient action. To the attainment of such end the endless gathering-chains G and G' are, as has hereinbefore been observed, driven at a rate of speed which is somewhat faster than the speed at which the machine will ordinarily be drawn through the field. In this way the gathering and feeding fingers of these endless traveling chains, but more particularly the rearwardly and upwardly traveling fingers of the endless chain or belt G, will act to depress the stalks toward the rear, and hence to bend them down in a direction contrary to the progression of the machine. The act of thus bending or tilting back the stalks serves to bring them into position to pass more rapidly between the inclined rolls, it being evident that the more nearly a stalk extending up between the rolls is forced back into a position parallel with the space between the rolls the more rapidly the stalk can pass down between the same.

The endless chain or link belt G' may be and herein is employed as an endless traveling support for fingers 7, which co-operate with the fingers of the opposite chains, G, to an extent only to gather and direct the stalks into the receiving-space 5 between the forward lower ends of the rolls. The endless chain G' can therefore be made comparatively short and arranged upon sprocket-wheels 15 and 16, herein mounted at the forward end portion of the machine, with the sprocket-wheel 16 set just back of the upturned end of one of the stalk-lifters. The fingers 6 of the endless chain G, however, desirably continue to act upon the stalks after parting from the fingers of the chain G', and hence the chain G is made considerably longer than the chain G' and arranged upon sprocket-wheels 17 and 18, which are mounted so that the chain G can be guided by appropriate pulleys in a manner to cause its fingers to sweep over the entire snapping portion of the rolls. By such arrangement the stalk, no matter what its height, will be subject to a set of fingers on an endless chain or belt until the last ear at the highest point on the stalk has been snapped off, it being here observed that the upward extension of the snapping portions of the rolls to a considerable height, and, further, the action of the fingers 6, traveling rearwardly over such snapping portion and laying back the stalks, will under all ordinary circumstances adapt the machine to corn of any height and effect the snapping off of the ears from the lowest to the highest points where they may be found upon the stalks.

Where by reason of a stalk being of unusual height or from any cause whatsoever the ear would not be snapped off before reaching the upper terminals of the snapping portions of the rolls, the passage of the unsnapped ear beyond such point is prevented and its snapping off insured by a check, H, consisting of an arm fixed upon the machine and arranged to extend across the snapping portions of the rolls adjacent to the upper terminals of such parts, as in Figs. 1 and 3. The ears will usually be snapped off before reaching the check H. Should, however, the ear arrive in an unsnapped condition at the point where the check H crosses the rolls, the ear will be arrested by such check, as in Fig. 3, at which moment the pressure of one of the fingers of a conveyer, L, against the ear will inevitably break or snap it off from the stalk.

The ears that have been snapped off from the stalks are carried up to the husking portions of the rolls by the fingers of chain conveyer L. This conveyer consists of an endless chain or belt provided with fingers, as aforesaid, and arranged so that during operation the fingers shall for a portion of the travel of the chain or belt traverse a path extending substantially over and along the line of separation between the forward snapping-roll portions or snapping-rolls and, further, extending substantially over and along the line of separation between the rear husking-rolls. In this way the ears will be taken by the conveyer-fingers as soon as snapped off, and from the points where they are snapped off carried in an unhusked condition and without delay in a direct path back to and along the husking-rolls, where they are finally deprived of their husks. By such arrangement the ears are not permitted to accumulate over the snapping-rolls, and by employing a conveyer of such character the ears will be carried back with all desirable rapidity and at the same time without any grinding or cutting action tending to shell the corn. With regard to this conveyer, a distinctive feature of its employment consists in its arrangement and connection with any suitable construction of snapping and husking rolls, whereby the ears, as soon as they are snapped off in an unhusked condition, are carried from the points of snapping directly back to the husking-rolls, where they are husked. The ears that have thus been snapped off from the stalks are guided in their ascent and protected from the snapping portions of the rolls by guards I and K, respectively arranged parallel with the rolls and fixed so as to overhang the same. These guards partake somewhat of the curvature of the rolls and extend over and along the snapping portions of the same, so as to provide in effect a long trough having along its bottom a longitudinal space or passage of ample width for the passage of the stalks, and adapted, while permitting the butt-end of the ears to be brought sufficiently close to the stalk space or passage between the rolls, to prevent the ear from getting into the same. In this connection the provision of the small roll E, in conjunction with the larger roll, D, becomes of particular advantage, since by such arrangement the guards I and K can be set so as to effectively keep the ear from off the rolls and thus prevent shelling of the corn, while at the same time the butt-end of the ear can be brought close to the rotary snapping or pinching surfaces, and thereby allow the same to act upon the weakest point of connection between the ear and the stalk. The guard or shield I is in effect depressed along one edge portion, with such inclined or depressed edge portion extended toward the line of separation between the rolls. In this connection it will be observed that whether the rolls be made of like or of different relative diameters the depression of one edge portion of a guard or shield over one roll can be made to bring such depressed edge of the guard so near to the opposite roll and within such close proximity to the line of separation between the rolls as to provide between the guard and the uncovered roll a stalk-passage, which is of sufficient width to admit the stalks, but not the ears, and which shall be so close to the line of separation between the rolls as to permit the rolls to pinch the stalks close up to the butt-ends of the ears, and thereby effect the separation of the two at the weakest point. The guard K is not, therefore, absolutely necessary, since after snapping off the ear in an unhusked condition the narrow stalk space or passage will prevent the ear from getting caught between the rolls, and the ear can be carried back along the guideway formed between the depressed or inclined edge portion of the guard or shield and the uncovered roll, which latter should, of course, in such case be made with a smooth surface. The best results are, however, attained by making the two snapping-rolls of different relative diameters, as illustrated in Figs. 2 and 3, wherein the guard or shield I is arranged over the larger snapping-roll, 9. In such case, by employing a comparatively small snapping-roll, 10, in conjunction with a comparatively large roll, the pinch can be more readily made close up to the butt-ends of the ears, and where the rolls are thus relatively sized it is advantageous to extend the depressed edge of guard I toward the smaller roll as well as toward the line of separation between the two rolls, and to further extend said edge of the guard somewhat to one side of a vertical plane parallel with and passing through the line of separation between the two rolls, so that when the ear is drawn down to the stalk-passage between the guard I and the smaller roll the ear striking against the edge of the guard will be deflected somewhat to one side and thereby facilitate its snapping off. The guard K may, however, be employed to cover the smaller snapping-roll, whereby as soon as the ear is snapped off it will lie in a trough or guideway formed between the sloping opposing edges of the two guards. In this connection it will be observed that the fingers of the chain or belt G travel in a path somewhat higher than but substantially parallel with the path traversed by the fingers of the elevating chain conveyer L. The fingers $22^a$ of the chain conveyer L are, when used in connection with the guard K, somewhat widened toward their ends, so as to ride within comparatively close proximity to said guard and take the snapped-off ears with certainty. The fingers of the conveyer L also assist to some extent in the feed of the stalks, to which end they are arranged so that when a gathering-finger of the chain belt or carrier G' is in the act of leaving a stalk and passing around the sprocket-wheel 15 a finger of the conveyer L will take such stalk in time to prevent its being drawn to one side by the departing finger of chain G'.

Figure 11:
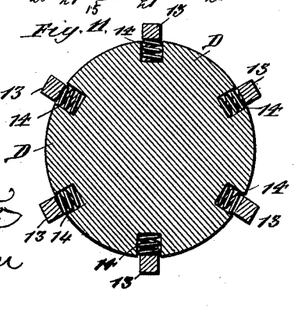
Fig. 11 represents on a somewhat larger scale a section taken transversely through the snapping portion of one of the rolls, the line of said section being denoted by dotted lines 11 11, Fig. 9.
Figure 12:
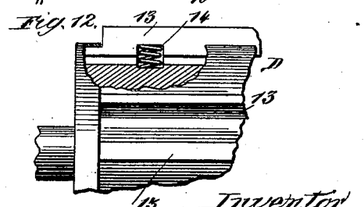
Fig. 12 is an enlarged detail, partly in elevation and partly in longitudinal section, of a portion of the roll shown in the preceding figure.
Figure 14:
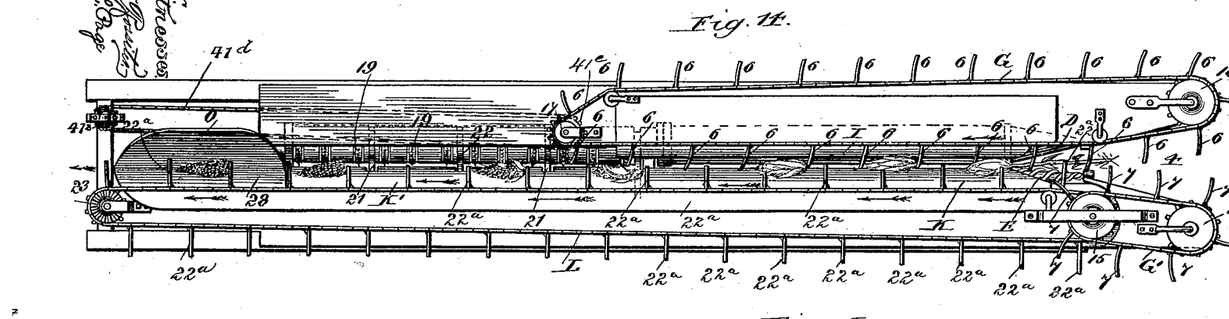
Fig. 14 is a detail representing in top plan view the arrangement of guards, rolls, and endless chains or belts provided with fingers.
Figures 15, 16, 17, 18:
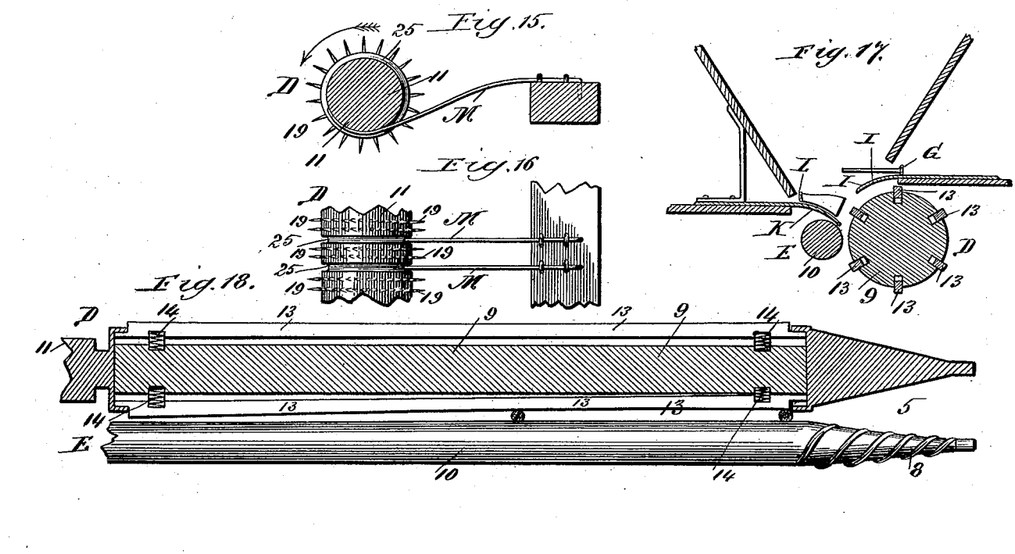
Fig. 15 is a detail representing a section taken transversely through the toothed husking-roll on line 15 15 of Fig. 9, with one of the strippers placed in co-operative relationship with said roll.
Fig. 16 is a top plan view of a pair of such strippers with a portion of said husking-roll.
Fig. 17 is a section taken transversely through the snapping-rolls, guards over the same, the endless chain G, provided with fingers, and conveyer L.
Fig. 18 represents the two snapping-rolls with one of said rolls in longitudinal section.

As a further feature of improvement one of the rolls is provided with spring-backed ribs arranged for engaging the stalks, and serving not only to take a firm hold thereon, but also to yield to different sizes of stalks. Each rib 13 preferably consists of a strip or bar arranged longitudinally along the roll and made with corner edges suitable for engaging the stalks. The springs 14 for backing these ribs are conveniently confined within recesses or longitudinal grooves formed along the roll and capable of providing guide-walls for a portion of the thickness of the ribs, as in Fig. 11, wherein it will be seen any one of the ribs can be depressed to some extent in its allotted recess, groove, or seat. The ribs can be, and by preference will be, made of flexible spring strips or bars, which feature adds to the efficiency of the springs 14, as illustrated by Fig. 18, wherein a stalk of a certain diameter is shown between the snapping-roll 10 and the end of one of these ribs, and a stalk of another diameter between the roll and the middle portion of the rib. Under such condition the spring back of one end of the rib will be compressed perhaps to the limit, or nearly so, while by reason of the flexibility of the rib its middle portion will be bent back into the longitudinal recess. This feature permits the ribs to act with great efficiency at all points along their length. In connection with a ribbed roll the guard I will cover the same, but permit the ribs to engage the stalks close up to the butt-ends of the ears, and for all practical purposes I find the arrangement of longitudinal ribs the best, since all forms of spiral ribs tend more or less to twist the ears and shell the corn in place of effecting a quick clean snap at the junction of the husked ear with the stalk.

Figures 5, 6, 7, 13:
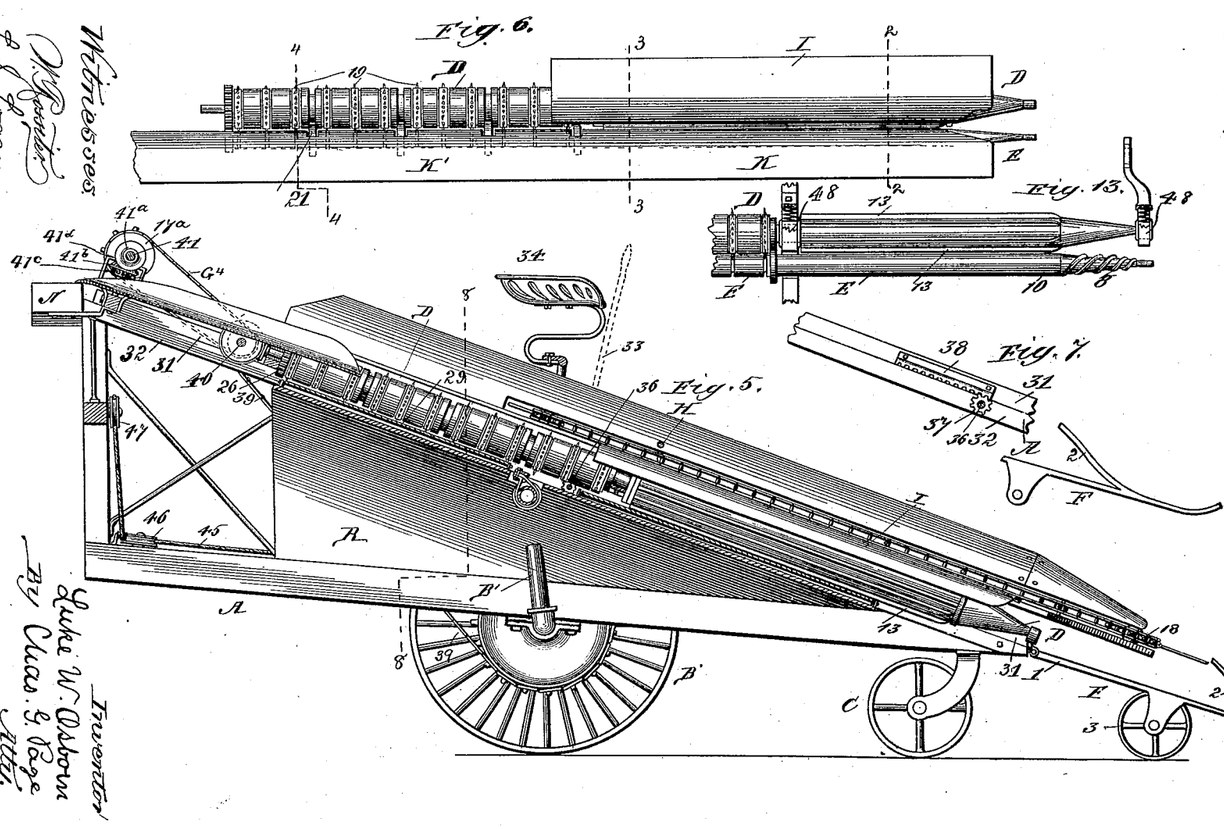
Fig. 5 represents a section taken on a vertical plane longitudinally through the machine on dotted line 5 5, Fig. 1.
Fig. 6 is a detail representing in top plan the rolls and guards over the same.
Fig. 7 is a detail representing a portion of the main wheeled body-frame and a portion of the adjustable frame which provides a support for the harvesting and husking devices, with a rack and pinion employed in the adjusting mechanism. This view also includes one of the stalk-lifters detached.
Fig. 13 represents the roll D made in two separate lengths and mounted on spring-bearings, the roll E in this figure being, however, in one length.

The guard I terminates at the upper terminal of the snapping portion 9 of roll D, so as to expose the toothed portion of one of the rear husking-rolls, 11, while the guard K is, on the contrary, extended beyond the snapping portion 10 of roll E and continued over and along substantially the entire upper length of said roll, so as to provide a guard, K', over the husking portion 12 of the same, as best illustrated in Figs. 1 and 6.

The roll D is provided at intervals along its husking portion with some suitable arrangement of husking-teeth, preferably with annular circumferentially-arranged lines of teeth 19, while the roll E is provided with a series of annular circumferentially-arranged grooves, 20, arranged at intervals in correspondence with the annular lines or sets of teeth on the opposite roll. While the teeth could be arranged in longitudinal lines and the grooves be made longitudinal along rolls E, the foregoing arrangement of annular sets of teeth and grooves is preferable.

The perimeters of the husking portion of the two rolls set closely together, so as to permit them to take a firm hold upon the husks as the latter are stripped from the ears by the husking-teeth, which while projecting from one roll are received in the grooves of the opposite roll. The guard K' over the husking portion of roll E tends to maintain the unhusked ears over against the husking-teeth of the opposite roll, and also keep the ears from being drawn down between the rolls and shelled; but as an additional means for forcing the unhusked ears against the husking-teeth the roll E is provided with one or more (preferably with a plurality of) annular peripherally-arranged ribs or flanges 21, which are received in annular grooves 22, formed in the roll D. These ribs constitute projections, stops, or abutments, which during the upward passage of the unhusked ears in the guideway that is formed between guard K' and roll D serve to deflect the ears from a straight upward passage and force the ears over against the husking-teeth.

By the foregoing arrangement one of the rolls is provided with husking-teeth and grooves at intervals between such teeth, while the opposite roll is provided with projections registering with such grooves, it being obvious from the statement hereinbefore made that the teeth could, if desired, be arranged in longitudinal lines; that said grooves and projections could in such case be made to conform to the spaces between the longitudinal rows of teeth—that is to say, without change of result the grooves could be made between the longitudinal rows of teeth—and hence no limitation is herein placed upon the particular form of grooves 22, nor upon the particular form of ribs or projections 21, it being evident that the improvement consists in grooving one roll at suitable points and providing the other roll with projections registering with such grooves.

The guard K' is provided along its lower inner longitudinal edge with gaps or notches corresponding in position to the location of the projections, flanges, or shoulders 21, in which way these projections, flanges, or shoulders can project above the guard, which latter can be set down as closely to the roll E as may be desired.

By the foregoing arrangement one of the husking-rolls is provided with sets of teeth alternating with plain cylindric surfaces, while the opposite roll is provided with grooves or recesses which register with the sets of husking-teeth and with plain cylindric surfaces which match the plain cylindric surfaces of the opposite roll. These plain cylindric surfaces serve to take a firm bite or hold on the husks as the latter are scratched up and loosened by the husking-teeth and effectively strip the husks from the ears and draw the husks between the rolls.

The guard K', which may be regarded either as an extension of or as separate from the forwardly-arranged guard K, is along one edge portion preferably depressed somewhat toward the line of separation between the husking-rolls. The position of this guard causes it to so guide the unhusked ears that they will be subjected to the action of the husking-teeth of the rotary toothed husking-roll, while the ribs or projections on the untoothed husking-roll serve to deflect the ears to still greater advantage against the husking-teeth.

The ears that have been snapped off from the stalks are carried up to and along the husking portions of the rolls, or "husking-rolls," as they may be termed, by the conveyer L, which also serves as a means for conveying the husked ears up to the point of discharge. The fingers 22ª of the endless chain conveyer L are desirably made flat and comparatively broad, so as to engage and carry the ears up to the point of discharge with certainty. This endless chain conveyer L is conveniently arranged upon a couple of sprocket-wheels, 23 and 24, respectively, at opposite ends of the machine, the sprocket-wheel 24 being rigid with or fixed upon the axle of the sprocket-wheel 15, so that the gathering-chain G' can be driven from the chain conveyer L.

The husks which are scratched or picked from the ears by the husking-teeth are caught between the rolls and carried down between the same, thus entirely stripping the husks from the ears, the guard K' preventing the ear from being drawn between the rolls and shelled. The husks, after being drawn down between the two rolls, are stripped from the roll D by a set of strippers, M, Figs. 8, 15, and 16, consisting of fingers secured to the main frame and arranged with their free ends tangential to and against or close up to the said roll. The stripping-fingers are preferably spring-fingers secured at one end to some suitable fixture and arranged with their free ends projecting in annular grooves 25, that are formed in the roll D alongside the sets of husking-teeth. The arrangement of grooves 25 and strippers M adjacent to the sets of husking-teeth is desirable, since the husks passing between the rolls will be caught upon the teeth and would be carried round with the same were it not for the strippers.

As a result of the foregoing construction and organization of parts the snapping of the ears from the stalks is effected with great rapidity and certainty and the stalks left standing in the field, it being here noted that farmers particularly desire that the stalks should be so left.

As soon as the ears have been snapped or pulled from the stalks no time is lost in conveying the ears to the husking portions of the rolls, or "husking-rolls," as they are herein indifferently termed, and hence no tossing about of the ears is rendered necessary, it being seen that the husking portions of the rolls are upwardly-inclined continuations of the lower inclined snapping portions, so that from the time of entry of a stalk between the rolls to the moment of delivery of an unhusked ear to a trough or hopper at the rear of the machine the ear is carried continuously upward, first on the stalk until it is snapped and then in a substantially direct upward course to the point of discharge, it being seen that while during such upward course the ears are at points along the husking-rolls slightly deflected by projections on the untoothed roll, so as to throw them over against the toothed roll, their course is substantially direct. The snapping and husking rolls being thus formed of two long rolls, whereof the forward portions are the snapping-rolls and the rear portions the husking-rolls, the objectionable complication and weight of mechanism for driving four separate rolls—two for snapping and two for husking—is herein avoided, it being seen that the rolls D and E can be and herein are driven from one end, and that when so driven it is merely necessary to connect the rolls together at their upper end by gear-wheels 26 and 27 and drive one roll, which will in turn drive the other.

The arrangement of the husking portions of the rolls in line with but higher than the snapping-roll portions avoids any undesirable width of machine, and, further, places the husking-roll portions sufficiently above the stalks that have left the snapping-roll portions to avoid breaking such stalks down, and permits a construction of machine which can have in transverse section a sort of inverted-V shape, and which therefore can pass freely over the standing stalks.

In order to provide beyond the upper ends of the husking-rolls suitable space for driving mechanism at the upper end of the machine, and also to extend the main frame up a height suitable for providing a point of discharge adjacent to a trough or hopper, N, properly elevated with relation to such wagon as may be hitched onto the rear of the machine for receiving the husked corn from said trough or hopper, the guard K' is extended beyond the roll E, and beyond the upper end of the husking portion of roll D a guard, O, is arranged to provide, in conjunction with the upper extended end portion, 28, of guard K', a trough or way along which the husked ears will be carried by the conveyer L, which serves to discharge the husked ears into the trough or hopper N.

In order to effectively guard against the ears being thrown over either side of the machine, side-boards P are arranged to extend along the machine substantially from its forward to its rear end. These side-boards are secured in any suitable way upon the main frame and are set apart about as shown in Fig. 1, wherein said boards are for convenience of illustration partially broken away. At their lower ends these boards P diverge forwardly, so as to leave the gap or space 4 clear or open.

Figure 10:
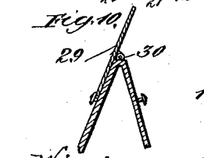
Fig. 10 is a detail taken transversely through the double inclined or inverted-V shaped bottom of the husk-gathering receptacle, and shows in cross-section a husk-deflecting board or plate hinged to said bottom, the position of said husk-receptacle in the machine being indicated in dotted lines, Fig. 8.
Figure 19:
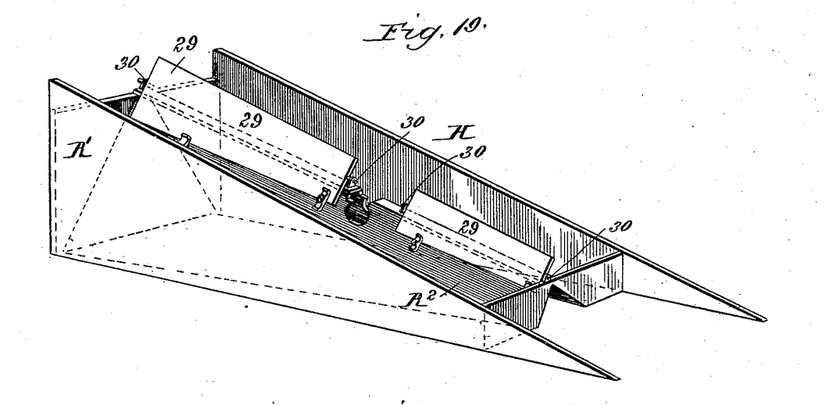
Fig. 19 shows the husk-receptacle detached.
Figure 20:
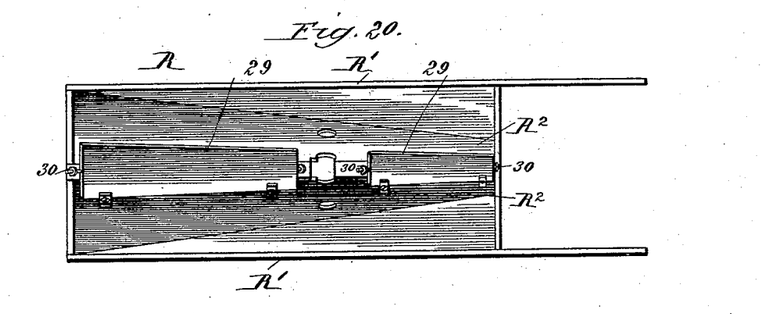
Fig. 20 is a top plan view of said husk-receptacle.
Figure 21:
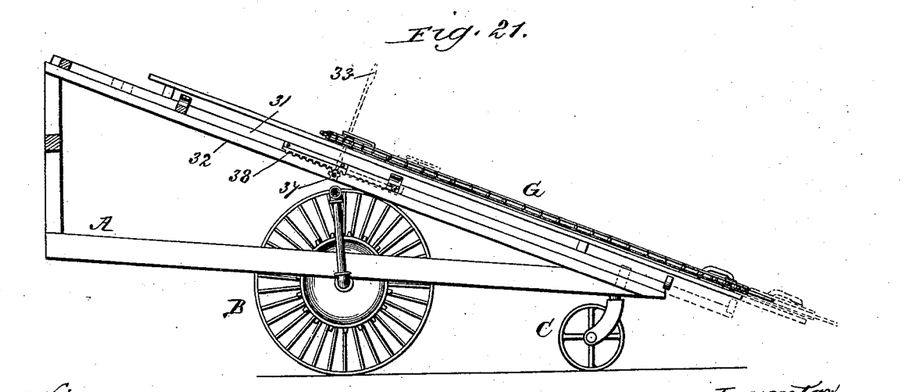
Fig. 21 represents, mainly, a central longitudinal section taken on a vertical plane through the frame of the machine and illustrates in dotted lines the downward adjustment of the upper adjustable frame.

In order to collect the husks, I provide a husk-receptacle, R, arranged in position to catch the husks as they are stripped from roller D by the strippers. This husk-receptacle can be made with vertical sides R', but has a bottom, R², which is in cross-section of an inverted-V shape, whereby the presence of said receptacle will not interfere with the standing stalks as the machine is drawn along the field. The husk-receptacle can be secured to the main frame in any suitable way, and as an additional feature of improvement in this connection I provide the husk-receptacle with a tilting or deflecting board or bottom extension, 29, Figs. 10, 19, and 20, which extends along the length of the husk-receptacle, along its longitudinal middle line, hinged or pivoted upon the highest middle line of the inverted-V-shaped bottom of the husk-receptacle, as at 30. With such arrangement the high middle line of the bottom of the husk-receptacle will stand somewhat below the husking portions of the rolls, whereby when, for example, the hinged husk-deflecting board 29 is in the position indicated in Fig. 10 the husks will collect in one side of the husk-receptacle. As soon, however, as this side of the husk-receptacle becomes full the board 29 can be tilted to the other of its two extreme positions, and thereby direct the falling husks into the space along the right interior side of the husk-receptacle.
20 ceptacle.

Figure 8:
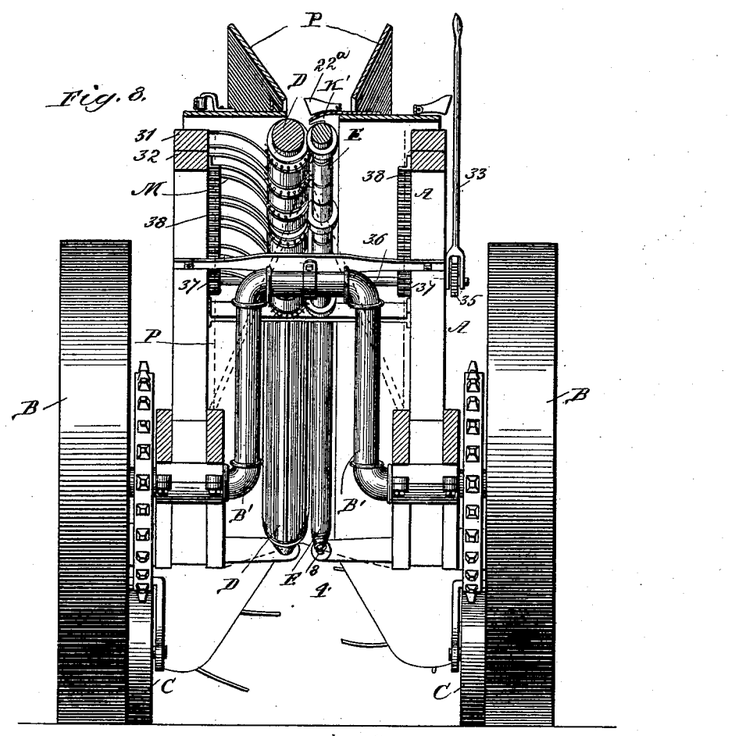
Fig. 8 is a vertical section taken transversely through the machine in rear of the main axle on dotted line 8 8, Figs. 1 and 5, and looking toward the forward end of the machine.
Figure 9:
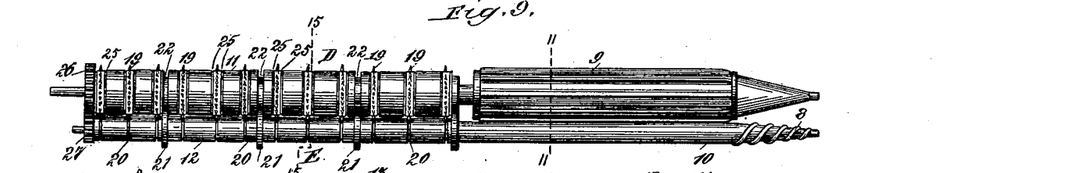
Fig. 9 represents the snapping and husking rolls.

The axle B' for the main driving and supporting wheels is bent up as in Fig. 8, so as to avoid interfering with the standing stalks over which the machine passes, it being seen that the inverted-U bend of the axle provides space for the stalks as they are left by the rolls. Where a husk-receptacle such as herein shown is employed the bent axle can pass through the inclined portions of the bottom of such receptacle, as will be readily understood without further description.

The snapping and husking rolls and devices auxiliary thereto are supported upon an inclined frame, 31, which said frame is in turn supported upon some suitably-constructed inclined support or guideway, which may, for example, be provided by the upper inclined side sills, 32, of the wheeled main or body frame A. The frame that carries said snapping and husking devices is arranged so that it can be adjusted in position along its inclined support, which latter, while conveniently formed by the upper side sills, 32, as hereinbefore mentioned, can be formed by any other suitable arrangement of bars, timbers, or the like arranged to uphold and maintain the frame 31 in an inclined position, but permit such frame to be moved in the direction of its length. In this way the end movement of frame 31 in either direction serves to move it along an inclined plane, and hence while such corn gathering and husking devices as may be employed can be readily raised and lowered by an end adjustment of the frame or support 31, whereon they are arranged, such adjustment will not change the inclination of either the snapping-rolls which snap the corn or the husking-rolls which husk the same. Said rolls can therefore be maintained at an inclination which serves to render them most effective. With regard to this feature of the machine it is herein understood that no limitation is placed upon the particular construction or arrangement of devices adapted for harvesting the corn, and likewise that no limitation is placed upon the construction of husking-rolls, it being obvious that the gist of the improvement consists in providing for such corn-harvesting devices as it may be desired to employ a supporting frame arranged for adjustment in an inclined plane, substantially as hereinbefore set forth, in contradistinction to older machines, wherein the corn-harvesting devices could only be raised or lowered relatively to the ground by tilting a wheel-supported body-frame whereon they were arranged.

The adjustment of the adjustable frame or support for the harvesting and husking devices is readily attained by a rack, pinion, and hand-lever, or other suitable means.

As herein shown, the hand-lever 33 is arranged within convenient reach of an attendant occupying the driver's seat 34, and is provided with a double end pawl for engaging either with the front or with the rear of a ratchet-wheel, 35, on an axle, 36, carrying a couple of gear-wheels, 37, and mounted upon the lower wheel-supported portion of the main frame. These gear-wheels 37 engage racks 38 on the adjustable frame 31, whereby by operating the hand-lever the frame or support for the harvesting and husking devices can be raised or lowered at will, and hence said devices adjusted in height with reference to the condition of the field and without changing the inclination of the rolls.

Various arrangements for driving the rolls and conveyers could obviously be employed, and hence no limitation is herein imposed upon the driving mechanism. As one of a variety of arrangements of driving mechanism, brief reference may, however, be made to one of such herein shown, and comprising endless chains 39, driven from the main supporting and driving wheels and serving to drive a shaft, 40, provided with sprocket-wheels for said chains, it being understood that in this connection any suitable clutch can be employed for the usual purpose in machines of this class. The rolls D and E can be geared to and driven from a shaft, 40, and from said shaft 40 can be driven a shaft, 41, mounted at the upper rear end of the machine, and provided with a sprocket-wheel, 17$^a$, for the chain G$^4$ and with a gear-wheel, 42, arranged to engage and drive the sprocket-wheel 23, that is provided as an upper sprocket-wheel for the chain conveyer L.

As one way in which the endless chain G can be driven the shaft 41 is provided with a bevel-gear, 41$^a$, engaging and operating a gear, 41$^b$, which is formed upon or rigid with a chain-wheel, 41$^c$, and the axle of the chain-wheel or sprocket 17 is provided with a link-chain sprocket 17 is provided with a link-chain wheel or sprocket, 41$^e$, that is connected with the chain-wheel 41$^c$ by a driving-chain, 41$^d$.

The shafts of the machine are extended forward from opposite sides of the machine and adjustably hinged or pivoted thereto, so that they can be raised or lowered, as may be desired. A portion of one of the two shafts S is represented in Fig. 1, wherein the shaft is pivoted adjacent to its rear end upon a short standard, 43, rising from the adjustable frame, and at its rear end is adjustably attached to a short slotted standard, 44, to which it can be secured by a bolt and nut or the like.

In order to provide for an evener, a rope, 45, extending along opposite sides of the machine and across the rear portion of the latter, is arranged to pass over pulleys 46, respectively, at the opposite rear corners of the main frame, and also over a middle pulley, 47, likewise mounted upon the main frame, but arranged somewhat higher than the pulleys 46, whereof one of said pulleys is herein shown.

The advantages of having each of the two rolls D and E formed to extend continuous for substantially the length of the machine and of adapting the lower portion of each roll for snapping and the upper portion thereof for husking have hereinbefore been particularly emphasized. Aside, however, from the advantage of making each roll continuous, as aforesaid, further advantages are derived from providing two parallel roll-surfaces set at an incline and adapted whereby a certain length of roll-surfaces from their lower ends upward shall be devoted exclusively to snapping off the ears, while the remaining upper length of roll-surfaces shall be devoted exclusively to husking the ears after the latter have been snapped off and while they are being conveyed up along the rolls by a suitable conveyer. For some of the purposes of this invention said last-stated ends can be attained by either three or four rolls, all arranged with their axes substantially in one and the same inclined plane, or at least in planes parallel with one another and in close proximity. As an illustration of such arrangement the roll D is shown in Fig. 13 as a divided roll—that is to say, as being made in two separate lengths arranged end to end and with one length in alignment with the other. In such case the lower length can be devoted to snapping, while the upper length can be devoted to husking. The roll E may, however, be continuous and equal in length to the two lengths of the roll D, or evidently the roll E could likewise be divided, if desired. In said Fig. 13 I have shown the straight longitudinal ribs solid with the lower length of roll D and have mounted said lower portion of roll in spring-backed bearings 48. The springs of these bearings serve to hold the snapping-surface of the lower length of roll D up to the stalk, and at the same time permit such snapping-surface to yield to any enlargement of the stalk and otherwise adapt itself to irregularities in size.

It will be understood that the spring-backed bearings would not answer for roll D where the latter is solid or in one piece from the lower commencement of its snapping portion to the upper termination of its husking portion, since such arrangement would tend to prevent the husking portions of the rolls from taking a proper grip on the husks at such times as the rolls would be forced apart by large stalks passing between their snapping portions. While, therefore, for certain purposes of this invention, as will be readily comprehended by those skilled in the art, the roll mounted in spring-bearings and provided with ribs rigid with the roll could be employed, I regard the roll provided with spring-backed ribs, as hereinbefore described, a distinct feature of improvement, it being obvious that greater certainty of action can be attained by the employment of spring-backed ribs, and that by making such ribs of flexible spring-strips in addition to backing them by springs still greater efficiency of action can be had.

While I have herein shown and described devices which I regard as the best for carrying my invention into effect, it will be obvious that various changes and modifications could be made by those skilled in the art, and hence I do not confine myself to the precise devices shown and described, but wish to be understood as including all equivalent devices coming within the spirit of my invention. It is also herein distinctly understood that as to the feature of the endless conveyer L, in combination with suitable forwardly-arranged snapping-rolls, suitable rearwardly-arranged husking-rolls extending back from the snapping-rolls, and a guard or shield adapted to provide a stalk-passage over and along the line of separation between the snapping-rolls, no limitation is placed upon the construction of guard so long as it is a guard adapted to provide such character of stalk-passage as will pass the stalks but not the ears, and that such guard may be a plate over one snapping-roll or a divided guard comprising two plates, one over each snapping-roll. It is also understood in the foregoing-mentioned connection that by the statement that one of the husking-rolls is uncovered to husk the ears I do not imply that the other roll must necessarily be covered, for although I deem a guard over one of the husking-rolls as the better arrangement, yet the ears could be husked if both husking-rolls were uncovered.

What I claim as my invention is—

1. In a corn harvesting and husking machine, the combination, substantially as hereinbefore set forth, of a pair of parallel rotary snapping-rolls for drawing the stalks between them and snapping off the ears in an unhusked condition, a pair of parallel rotary husking-rolls for husking such snapped-off ears, arranged in alignment with and extended back from the rear terminals of the snapping-rolls, and an endless conveyer chain or belt provided with fingers to take the ears at points where they are snapped off along the snapping-rolls and convey them back to and along the rear husking-rolls, where the ears are finally stripped of their husks.

2. The combination, substantially as hereinbefore set forth, with a pair of forwardly-arranged parallel rotary snapping-rolls, of a guard or shield extending along and parallel with the rolls at such a distance from the rolls as to provide between the rolls and the guard a stalk-passage, of a width to pass the stalks, but not the ears, and a pair of rearwardly-arranged parallel rotary husking-rolls which from their forward ends extend back from the rear terminals of the snapping-rolls, one of said husking-rolls being uncovered to husk such ears as have been snapped off along the snapping-rolls and brought back to the husking-rolls.

3. The combination, substantially as hereinbefore set forth, with a pair of forwardly-arranged parallel rotary snapping-rolls and a pair of rearwardly-arranged parallel husking-rolls extending back from the rear terminals of the snapping-rolls, of a guard or shield extending along and parallel with the rolls at such a distance from the rolls as to provide between the snapping-rolls and the guard a stalk-passage of a width to pass the stalks, but not the ears, and an endless conveyer chain or belt provided with fingers to take the ears at points where they are snapped off along the snapping-rolls and carry such snapped-off ears along the guard and deliver them to the rear husking-rolls, one of which said husking-rolls is uncovered to husk the ears.

4. The combination, substantially as hereinbefore set forth, with a pair of parallel rotary snapping-rolls, of a guard or shield extending over and along one roll and having one edge portion depressed toward the line of separation between the rolls to provide between said depressed edge portion and the opposite roll a stalk-passage which is of sufficient width to admit the stalks, but not the ears, and which is within such close proximity to the line of separation between the two rolls as to permit the rolls to pinch the stalks close up to the butt-end of the ears, for the purpose set forth.

5. The combination, substantially as hereinbefore set forth, with a pair of parallel rotary snapping-rolls having relatively-different diameters, of a guard or shield extending over and along the larger roll and having its longitudinal edge portion that is nearest the smaller roll bent downwardly both toward the line of separation between the rolls and toward the smaller roll, so as to leave a stalk-passage which is of sufficient width to admit the stalks, but not the ears, and which is within such close proximity to the line of separation between the rolls as shall permit them to pinch the stalks close up to the butt-ends of the ears, for the purpose set forth.

6. The combination, substantially as hereinbefore set forth, with a pair of rotary snapping-rolls whereof one is ribbed and both arranged for conjointly operating to draw the stalks between them, of a guard or shield, I, extending over and along the ribbed roll, and having one edge inclined downwardly toward the line of separation between the rolls to an extent to provide between its lower longitudinal edge portion and the roll that is alongside said ribbed roll a stalk-passage which permits the passage of the stalks and allows the ribs of the roll to engage the same close up to the butt-ends of the ears, but which prevents the ears from being engaged by said ribs, for the purpose set forth.

7. The combination, substantially as hereinbefore set forth, with a pair of rotary snapping-rolls, of the guard or shield I, arranged over and along one roll, and having one edge depressed toward the line of separation between the rolls and extended toward the opposite roll to an extent to provide between its depressed edge and the said roll that is opposite the roll covered by the guard or shield a stalk-passage somewhat to that side of a vertical plane coincident with and passing through the line of separation between the two rolls opposite the guard, whereby when the stalks are drawn between the rolls the ears will be deflected to one side by the guard, and the snapping off of the ears thereby facilitated.

8. The combination, substantially as hereinbefore set forth, with a pair of rotary snapping-rolls for drawing the stalks between them, of a pair of inclined guards or shields respectively arranged over and along the two rolls, and having their opposing longitudinal edge portions depressed toward the line of separation between the rolls, but leaving between their depressed edge portions a stalk-passage of sufficient width to admit the stalks, but not the ears, and within such close proximity to the line of separation between the rolls as to permit the rolls to pinch the stalks close up to the butt-ends of the ears, said guards being also arranged to provide between their inclined sides a trough for the snapped-off ears, for the purpose described.

9. The combination, substantially as hereinbefore set forth, with a pair of rotary snapping-rolls, of a pair of guards or shields respectively arranged over and along the two rolls, and having their opposing longitudinal edges depressed to form a trough, but leaving space between their edges to form a bottom passage in the trough of sufficient width to admit the stalks, but not the ears, and an endless elevator chain or belt provided with fingers which traverse the trough formed between the sloping sides of said guards, for the purpose set forth.

10. The combination, substantially as hereinbefore set forth, with a pair of snapping-rolls of relatively-different diameters, of the guards I and K, depressed along their opposing longitudinal edges, with the guard I standing higher than the guard K, and an endless conveyer chain or belt provided with fingers which during the travel of the belt traverse a path over and adjacent to the guard K, for the purpose set forth.

11. In a corn-harvester, a pair of parallel rotary snapping-rolls whereof one roll is provided with spring-backed ribs arranged with relation to the other roll to pinch the different sizes of stalks.

12. In a corn-harvester, a pair of parallel rotary snapping-rolls whereof one roll is provided with a series of longitudinally-arranged flexible spring-ribs, 13, substantially as and for the purpose described.

13. In a corn-harvester, a pair of parallel rotary snapping-rolls whereof one roll is provided with a series of longitudinal grooves and flexible spring-ribs, 13, backed by springs that are arranged within such grooves, substantially as described.

14. In a corn-harvester, a pair of parallel rotary rolls having a portion of their length constructed as snapping-rolls and a portion of their length adapted as husking-rolls for husking the snapped-off ears, one of said rolls having its snapping portion provided with ribs, and one of said rolls being along its husking portion provided with husking-teeth, for the purpose set forth.

15. In a corn harvesting and husking machine, the roll D, provided along a portion of its length with longitudinal ribs and along another portion of its length with annular rows of husking-teeth, combined with the roll E, having along a portion of its length grooves for receiving the teeth of the oppositely-arranged roll, for the purpose set forth.

16. The combination, substantially as herein set forth, with a pair of husking-rolls whereof one roll is provided with sets of husking-teeth alternating with grooves 22 and the opposite roll provided with peripheral projections which register with the grooves of the toothed roll, of the guard or shield K′, arranged over the untoothed roll and provided with gaps for the passage of the peripheral projections upon such roll, for the purpose described.

17. The combination, substantially as herein set forth, with a pair of husking-rolls, one of which is provided with husking-teeth and made larger in diameter than the opposite roll, of a guard or shield arranged over the smaller roll and depressed along one edge toward the line of separation between the two rolls, for the purpose described.

18. The combination, substantially as herein described, with the roll D, ribbed along the forward portion of its length, and along the rear portion of its length provided with husking-teeth, and the roll E, arranged parallel with said ribbed and toothed roll, of a guard extending along and over the ribbed-roll portion, but terminating short of the toothed-roll portion, so as to expose the husking-teeth, and a guard arranged over the length of the roll E, that is alongside the toothed-roll portion, for the purpose described.

19. The combination, with a pair of parallel rotary snapping-rolls and a pair of parallel rotary husking-rolls extending back from the snapping-rolls, of a raised check or stop, H, arranged over the rolls adjacent to the point of separation between the husking-rolls and the snapping-rolls and in position to insure the snapping off of ears from stalks of unusual height, substantially as described.

20. The combination, substantially as herein set forth, with a pair of parallel rotary snapping-rolls, of an endless conveyer chain or belt provided with fingers arranged to traverse a path adjacent to the line of separation between the rolls, so as to engage and carry back the snapped-off ears, and an endless chain or belt, G, provided with stalk gathering and conveying fingers which traverse a plane parallel with and above the plane traversed by the fingers of the conveyer L, for the purpose described.

21. The combination, substantially as herein set forth, with a pair of snapping-rolls, of an endless chain or belt, G, on one side, provided with stalk-gathering fingers which traverse a path in advance of and back over the snapping-rolls, a short oppositely-arranged endless chain or belt, G′, provided with gathering-fingers which co-operate with such of the gathering-fingers of the chain G as are in advance of the snapping-rolls, and an endless conveyer, L, which is arranged on the same side of but in rear of the belt or chain G′, and provided with gathering-fingers to take the snapped-off ears and convey the same up along the snapping-rolls, said conveyer L being arranged so that at the point where the stalk-gathering fingers of the endless belt or chain G′ leave the stalks the fingers of said conveyer L shall engage the stalks and prevent the fingers of said chain or belt G′ from drawing the stalks away from the fingers of the opposite chain or belt, G, substantially as described.

22. In a corn-harvester, the combination, with a wheel-supported main body-frame, of a frame or support carrying devices for harvesting the corn and adjustably held upon an inclined support with which the main body-frame is provided, whereby the height of such corn-harvesting devices may be varied without change of angle relatively to the ground.

23. In a corn harvester and husker, the combination, with the main body-frame, of a frame carrying husking-rolls and adjustably held upon an inclined support with which said main body-frame is provided, whereby the height of the husking-rolls can be varied without change of angle relatively to the ground, substantially as set forth.

24. In a corn harvesting and husking machine, the husk-gathering receptacle R, combined with and arranged below the husking-rolls and having its bottom formed with a longitudinally-extending raised middle portion providing along the under side of such receptacle a passage for the upper ends of the standing stalks, substantially as set forth.

25. The husk-gathering receptacle R, combined with and arranged below the husking-rolls and having its bottom formed with a longitudinally-extending raised middle portion, combined with the tilting husk-deflector 29, for deflecting the husks into either of the receptacle-spaces between the raised bottom portion and the sides, substantially as set forth.

LUKE W. OSBORN.

Witnesses:
J. T. DONAHOE,
DAVID CUMMINS.